United States Patent
Byun

(10) Patent No.: US 10,688,708 B2
(45) Date of Patent: Jun. 23, 2020

(54) MANUFACTURING METHOD OF PRESSURE CONTAINER COMPRISING IN-MOLD LABEL AND THREE-DIMENSIONAL SHAPE

(71) Applicant: Woo Hong Byun, Gwacheon-si (KR)

(72) Inventor: Woo Hong Byun, Gwacheon-si (KR)

( * ) Notice: Subject to any disclaimer, the term of this patent is extended or adjusted under 35 U.S.C. 154(b) by 211 days.

(21) Appl. No.: 15/640,607

(22) Filed: Jul. 3, 2017

(65) Prior Publication Data

US 2018/0001540 A1    Jan. 4, 2018

(30) Foreign Application Priority Data

Jul. 4, 2016   (KR) .................. 10-2016-0084012
Mar. 7, 2017   (KR) .................. 10-2017-0028934

(51) Int. Cl.
*B29C 49/24*   (2006.01)
*B29C 49/48*   (2006.01)
(Continued)

(52) U.S. Cl.
CPC .......... *B29C 49/2408* (2013.01); *B29C 49/24* (2013.01); *B29C 49/4823* (2013.01);
(Continued)

(58) Field of Classification Search
CPC ..... B29C 49/2408; B29C 49/24; B29C 49/66; B29C 49/52; B29C 49/4823;
(Continued)

(56) References Cited

U.S. PATENT DOCUMENTS

2002/0053760 A1* 5/2002 Boyd ................. B29C 49/46
                                                    264/532
2004/0241275 A1* 12/2004 Ryan ................. B29C 33/04
                                                    425/526
(Continued)

FOREIGN PATENT DOCUMENTS

CN    101500783 A    8/2009
CN    101541515 A    9/2009
(Continued)

OTHER PUBLICATIONS

European Search Report in Appln. No. 17824512.2 dated Dec. 17, 2018, 9 pages.

*Primary Examiner* — Francisco W Tschen
(74) *Attorney, Agent, or Firm* — Park, Kim & Suh, LLC

(57) ABSTRACT

A method of manufacturing a pressure container including an in-mold label and a three-dimensional (3D) portion includes heating molds with a 3D groove formed therein to correspond to a 3D portion to be formed on a surface of the pressure container, separating the molds, attaching a label to an internal surface of the molds to allow at least a portion of the label to cover the 3D groove, positioning a pre-form of the pressure container in a cavity of the molds, closing the molds and injecting air into the pre-form at pressure in a specific range through a first route in a specific pressure range and expanding the pre-form, and three-dimensionally deforming a label attached to a surface of the pre-form to correspond to the 3D groove by air pressure along with the
(Continued)

surface of the expanded pre-form while the expanded pre-form and the label are attached.

8 Claims, 13 Drawing Sheets

(51) Int. Cl.
    *B29C 49/66* (2006.01)
    *B29C 49/06* (2006.01)
    *B29C 49/52* (2006.01)
    *B29K 67/00* (2006.01)
(52) U.S. Cl.
    CPC .............. *B29C 49/52* (2013.01); *B29C 49/66* (2013.01); *B29C 49/06* (2013.01); *B29C 2049/2412* (2013.01); *B29C 2049/2427* (2013.01); *B29C 2049/2449* (2013.01); *B29C 2049/2477* (2013.01); *B29C 2049/2489* (2013.01); *B29C 2049/4838* (2013.01); *B29C 2049/4882* (2013.01); *B29K 2067/003* (2013.01)
(58) Field of Classification Search
    CPC .... B29C 2049/4838; B29C 2049/4882; B29C 49/06; B29C 2049/2489; B29C 2049/2449; B29C 2049/2477; B29C 2049/2427; B29C 2049/2412; B29L 2031/7156; B29K 2105/258; B29K 2067/003
    See application file for complete search history.

(56) References Cited

U.S. PATENT DOCUMENTS

| | | | |
|---|---|---|---|
| 2008/0164642 | A1 | 7/2008 | Hirdina |
| 2013/0256178 | A1* | 10/2013 | Kraus ................ B29C 45/1418 206/459.5 |

FOREIGN PATENT DOCUMENTS

| | | |
|---|---|---|
| CN | 103648747 A | 3/2014 |
| CN | 203921422 U | 11/2014 |
| EP | 1727661 A1 | 12/2006 |
| EP | 2441562 A1 | 4/2012 |
| EP | 3165474 A1 | 5/2017 |
| JP | H06-126818 A | 5/1994 |
| JP | H06-032340 Y2 | 8/1994 |
| JP | H07-156259 A | 6/1995 |
| JP | H08-238667 A | 9/1996 |
| JP | 2580274 B2 | 2/1997 |
| JP | 2000-142684 A | 5/2000 |
| JP | 3109726 B2 | 11/2000 |
| JP | 2004-136486 A | 5/2004 |
| JP | 2005-041230 A | 2/2005 |
| JP | 2006-276646 A | 10/2006 |
| JP | 2007-530314 A | 11/2007 |
| JP | 2008-012737 A | 1/2008 |
| JP | 2012-081714 A | 4/2012 |
| RU | 2189313 C2 | 9/2002 |
| WO | 2005/092594 A1 | 10/2005 |
| WO | 2008/018547 A1 | 2/2008 |

* cited by examiner

MANUFACTURING METHOD OF PRESSURE CONTAINER COMPRISING IN-MOLD LABEL AND THREE-DIMENSIONAL SHAPE

CROSS-REFERENCE TO RELATED APPLICATIONS

This application claims priority from Korean Patent Application No. 10-2016-0084012, filed on Jul. 4, 2016 and No. 10-2017-0028934, filed on Mar. 7, 2017, in the Korean Intellectual Property Office, the disclosure of which is incorporated herein by reference in its entirety.

BACKGROUND OF THE INVENTION

Field of the Invention

Apparatuses and methods consistent with the present invention relate to a method of manufacturing a pressure container including an in-mold label, and more particularly, to a method of manufacturing a pressure container, for forming a three-dimensional (3D) portion on an outer circumference surface of a pressure container including an in-mold label by performing a blowing operation on a pre-form.

Description of the Related Art

A container that is capable of withstanding an internal pressure in order to contain a fluid with an internal pressure, such as carbonated beverage is referred to as a pressure container.

The pressure container is generally manufactured via a blowing operation of manufacturing a pre-form and further injecting air to the pre-form.

In order to attach a label to a pressure container, the label is attached to an internal portion of a mold and then is smoothly attached to a surface of the container by expanding a pre-form, which is referred to as an in-mold labeling method.

However, when a pressure container with a label attached thereto is manufactured using an in-mold labeling method, an outer circumference surface of the pressure container is planar and, thus, when products are introduced using the pressure container, the products inevitably have a monotonous outer design and, thus, there is a limit in attracting consumers' attention, as disclosed in Japanese Patent Publication No. 2006-276646.

Conventionally, in order to form a three-dimensional (3D) portion on a plastic container, the 3D portion is formed on an external surface of the container, is covered with a label, and is thermally contracted. However, in this case, a boundary of a label portion (a hologram or a character part) that needs to cover a 3D portion and a boundary of the 3D portion do not match each other and, thus, it is difficult to produce a container that appropriately realizes aesthetics.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of manufacturing a pressure container, for attracting attention of people who see a label by three-dimensionally forming at least a portion of an external surface of the pressure container and deforming the label to achieve a stereoscopic effect on the pressure container.

According to an aspect of the present invention, a method of manufacturing a pressure container including an in-mold label and a three-dimensional (3D) portion includes heating molds with a 3D groove formed therein to correspond to a 3D portion to be formed on a surface of the pressure container, separating the molds, attaching a label to an internal surface of the molds to allow at least a portion of the label to cover the 3D groove, positioning a pre-form of the pressure container in a cavity of the molds, closing the molds and injecting air into the pre-form at a pressure in a specific range through a first route and expanding the pre-form, three-dimensionally deforming a label attached to a surface of the pre-form to correspond to the 3D groove by an air pressure along with the surface of the expanded pre-form while the expanded pre-form and the label are attached, injecting cooling air into the pre-form through a second route in the pre-form that is expanded and deformed like the container, and separating the molds and detaching the pressure container with the 3D portion and the label deformed to correspond to the 3D portion from the molds.

The label may include a description portion, an adhesive layer provided on an internal surface of the description portion and melt-adhered to the internal surface at a specific temperature or more, and a printing layer formed on an outer surface of the description layer and including a texture, a pattern, a picture, or a character printed on the printing layer to correspond to a protruding or recess-processed portion of the 3D portion, and the attaching of the label may include attaching the label to the molds so as to position the printing layer to correspond to the 3D groove.

The expanding of the pre-form may be performed by injecting air at a pressure in a first pressure range and, then, injecting air at a pressure in a second pressure range higher than the first pressure range.

The first route may be provided to be moved in up and down directions and implemented with an air supplying port to be disposed at an inlet of the pre-form, and the second route may be provided to be moved in up and down directions and implemented with a pipe of an air injection apparatus, to be inserted into the pre-form.

The heating of the molds may include heating the molds to maintain temperature of the molds in a temperature range of 40 to 80° C.

According to another aspect of the present invention, a method of manufacturing a pressure container including an in-mold label and a three-dimensional (3D) portion includes heating molds with a 3D groove formed therein to correspond to a 3D portion to be formed on a surface of the pressure container, separating the molds, attaching a label to an internal surface of the molds to allow at least a portion of the label to cover the 3D groove, positioning a pre-form of the pressure container in a cavity of the molds, closing the molds and injecting air into the pre-form at a pressure in a specific range by using an air injection apparatus installed outside the molds and expanding the pre-form, three-dimensionally deforming a label attached to a surface of the pre-form to correspond to the 3D groove by an air pressure along with the surface of the expanded pre-form while the expanded pre-form and the label are attached, injecting cooling air into the container formed by the expanded pre-form, and separating the molds and detaching the pressure container with the 3D portion and the label deformed to correspond to the 3D portion from the molds.

The expanding of the pre-form may be performed by injecting air through an air supplying port disposed at an inlet of the pre-form and configured to supply air into the pre-form, and the pre-form may be cooled by injecting cooling air into the pre-form through a pipe of an air injection apparatus provided to be inserted into the pre-form.

The expanding of the pre-form may be performed by completely injecting air at a pressure in a first pressure range and, then, injecting air at a pressure in a second pressure range higher than the first pressure range.

BRIEF DESCRIPTION OF THE DRAWING FIGURES

The above and/or other aspects of the present invention will be more apparent by describing certain exemplary embodiments of the present invention with reference to the accompanying drawings, in which.

Figure 11:
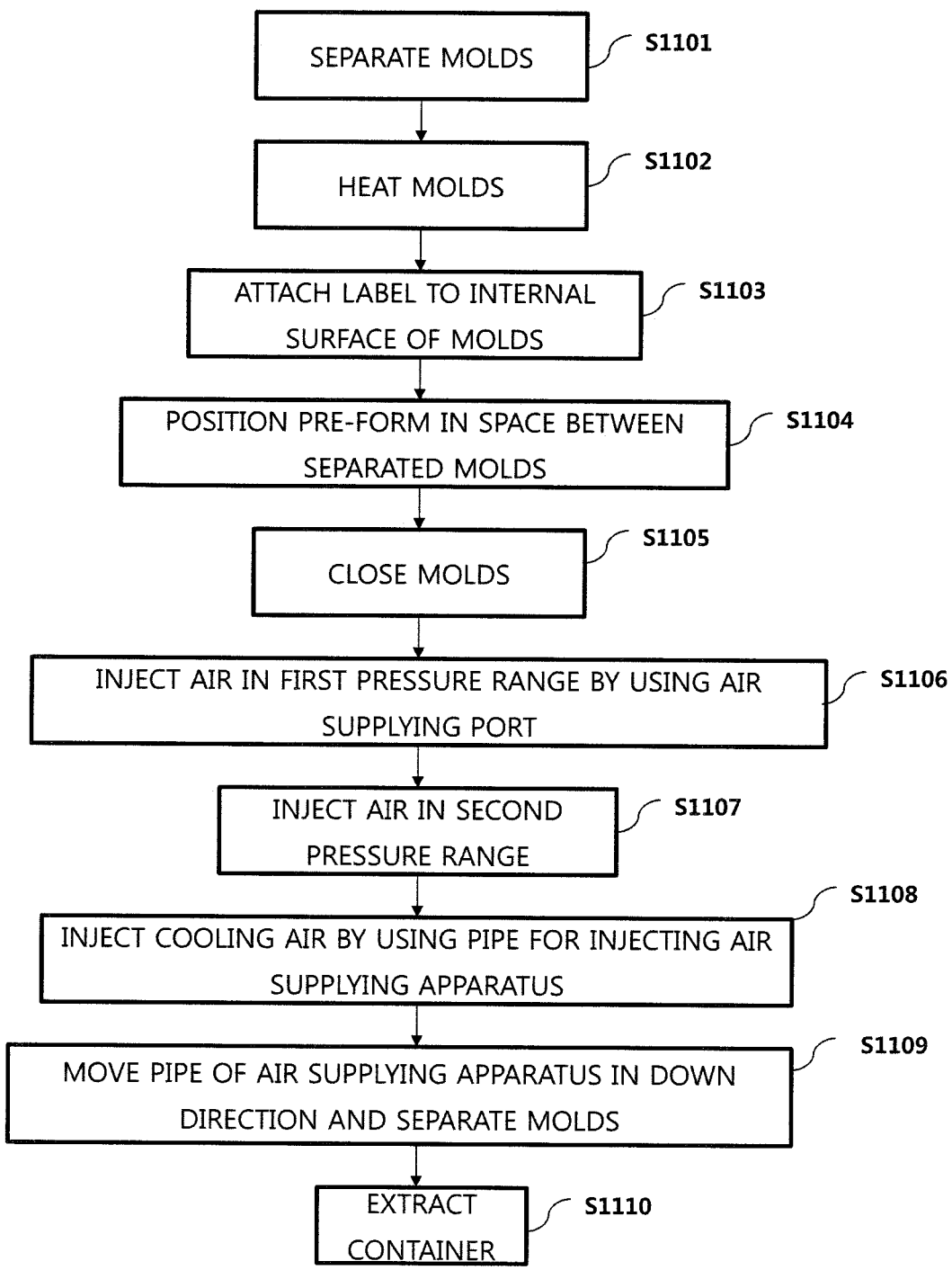

FIGS. 9 A to 10 D are diagrams illustrating a procedure of manufacturing a pressure container including an in-mold label according to the present invention; and FIG. 11 is a flowchart of the present invention.

DETAILED DESCRIPTION OF THE EXEMPLARY EMBODIMENTS

Hereinafter, the present invention will be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

The terms used in the embodiments of the present invention are provided to aid in the understanding of the present invention and not intended to limit the present invention.

An expression used in the singular encompasses the expression of the plural, unless it has a clearly different meaning in the context. Also, it is to be understood that the terms such as "comprise" and/or "comprising" are intended to indicate the existence of the components and are not intended to preclude the possibility that one or more components may exist or may be added.

Unless defined otherwise, all terms (including technical and scientific terms) used herein have the same meaning as is commonly understood by one of skill in the art to which this invention belongs.

Hereinafter, exemplary embodiments of the present invention will be described in detail with reference to the accompanying drawings.

Figure 1:
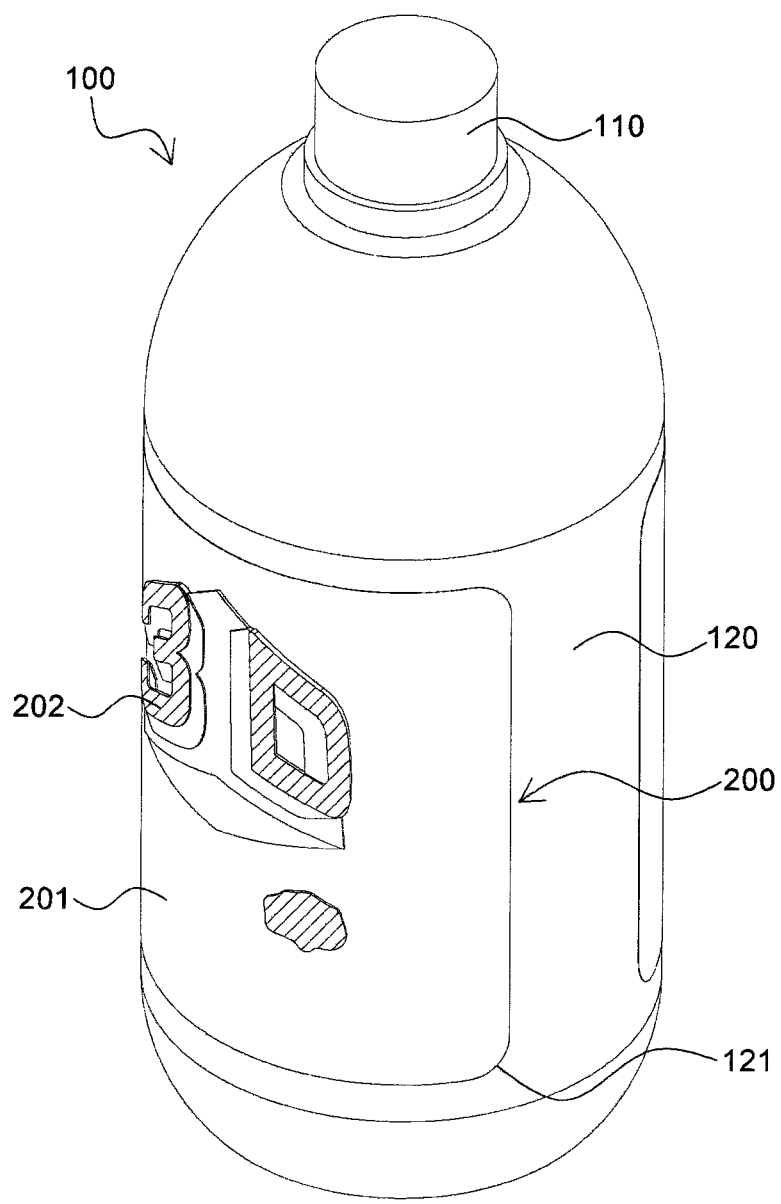
FIG. 1 is a perspective view of a pressure container including an in-mold label with a three-dimensional (3D) character formed therein.

As shown in FIG. 1, a pressure container 100 including an in-mold label 200 according to the present invention may include an inlet 110 and a body portion 120 with a larger diameter than the inlet 110.

The label 200 may be attached to an outer circumference surface of the body portion 120 and a step difference portion 121 formed during in-mold labeling may be formed at an edge of the label 200.

A step difference is formed between a portion with the label 200 attached thereto and a portion without the label 200 may be formed while the body portion 120 comes in contact with the label 200 during an expansion process of the pressure container 100 and, in this regard, the portion without the label 200 may slightly protrude outward compared with the portion with the label 200 attached thereto.

The label 200 may include a description portion 201 and a printing layer 202 that is provided on an external surface of the description portion 201 and positioned on a three-dimensional (3D) portion 122 (refer to FIG. 2) formed on the outer circumference surface of the pressure container 100, and protrudes or is recess-processed adaptively to a shape of the 3D portion 122 to realize an stereoscopic effect.

An adhesive layer 203 (refer to FIG. 5) may be formed on a rear surface of the description portion 201 and melt-adhered to a surface of an expanded pre-form (a pre-form for forming a pressure container) with high surface temperature during an in-mold labeling process to attach the label 200 to a surface of the pressure container 100.

With regard to a state in which the label 200 is attached to the body portion 120 of the pressure container 100, the printing layer 202 of the label 200 is positioned on the 3D portion 122 formed on the surface of the body portion of the pressure container 100 and, thus, the printing layer 202 is striking outward.

In particular, when the printing layer 202 includes a striking reflective layer or hologram layer, color is differently viewed depending on a human's gaze direction, thereby advantageously attracting interest or attention of people who see the printing layer 202.

In FIG. 1, a shaded portion may be a portion of the printing layer 202, which is processed as a hologram layer or a reflective layer, and may advantageously allow a 3D structure to remarkably stand out.

Figure 2:
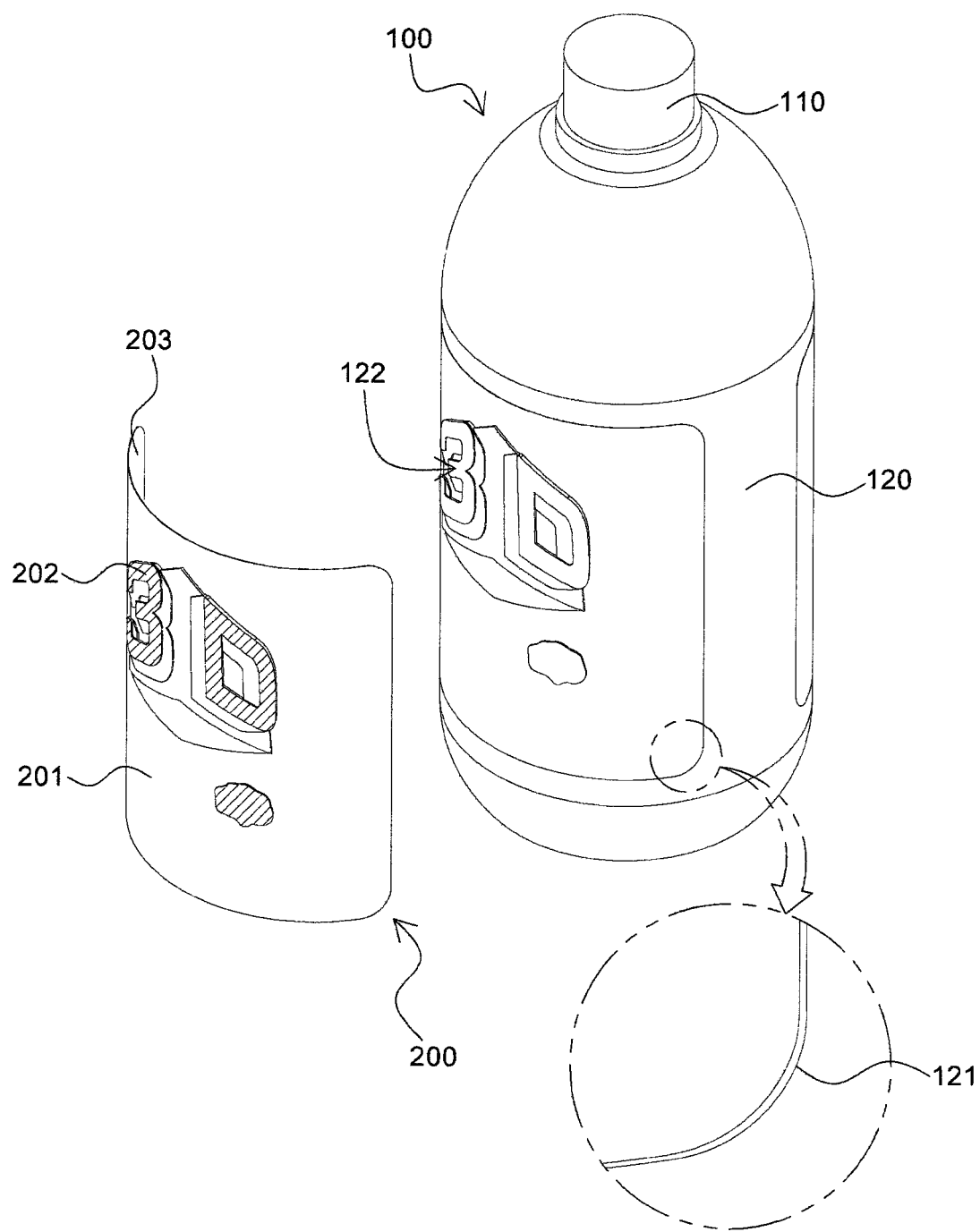
FIG. 2 is a perspective view illustrating a state in which a label is detached from a body portion of a pressure container of FIG. 1.

FIG. 2 is a perspective view illustrating a state in which the label 200 is detached from the body portion 120 of the pressure container 100.

The label 200 attached to the pressure container 100 according to the present invention may be originally formed as a planar two-dimensional (2D) structure instead of a 3D structure.

However, the printing layer 202 may be formed on a portion to be covered over the 3D portion 122 of the body portion 120 of the pressure container 100 and processed as a reflective layer or a hologram layer or implemented with different color from surface color of the description portion 201, a pattern, design, a number, a picture, or the like.

The label 200 that is originally formed as a 2D structure may be deformed and changed to a 3D structure by a pressure that is generated while the 3D portion 122 of the body portion 120 of the pressure container 100 is formed via in-mold labeling.

The 3D portion 122 may be formed on a surface of the body portion 120 of the pressure container 100 and may protrude outward or may be recessed compared with a different surface of the body portion 120 so as to be clearly distinguished from a boundary of the different surface.

In addition, a boundary of the 3D portion 122 and a boundary of the printing layer 202 of the label 200 may match each other or may be positioned at almost similar positions such that an outline of the 3D portion 122 stands out on the printing layer 202 of the label 200 without a change.

A line at an edge of a portion to which the label 200 is to be attached may indicate the step difference portion 121 and, in this regard, the step difference portion 121 may form a boundary between a non-labeled portion and a portion that is labeled during an in-mold labeling process.

Figure 3:
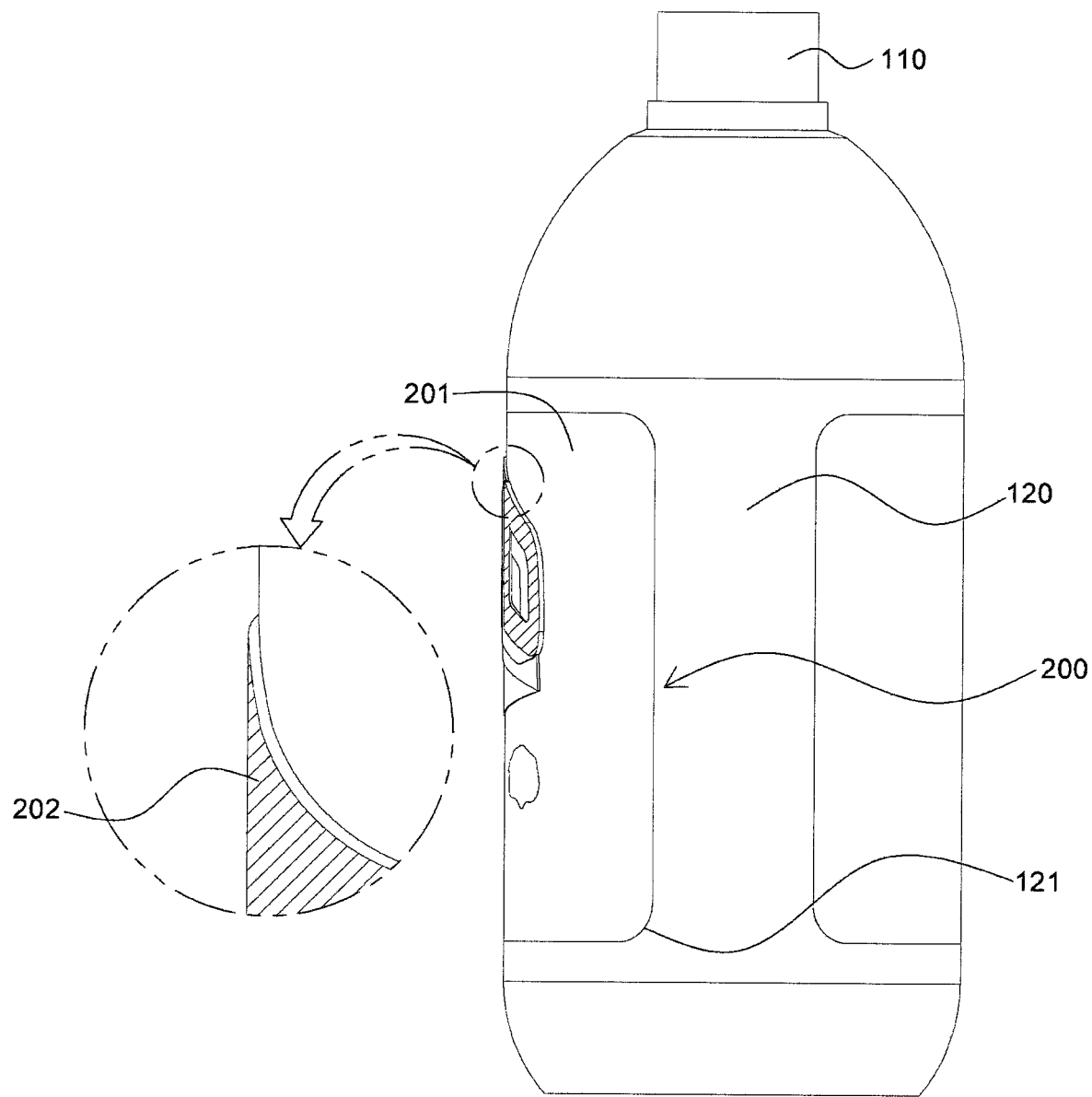
FIG. 3 is a side view of the pressure container of FIG. 1.

As shown in FIG. 3, when the pressure container 100 that is three-dimensionally formed and labeled is viewed from the side, the 3D portion 122 and the printing layer 202 that covers the 3D portion 122 may stand out outward, which remarkably causes a visual contour difference from a surface without the 3D portion 122.

Figure 4:
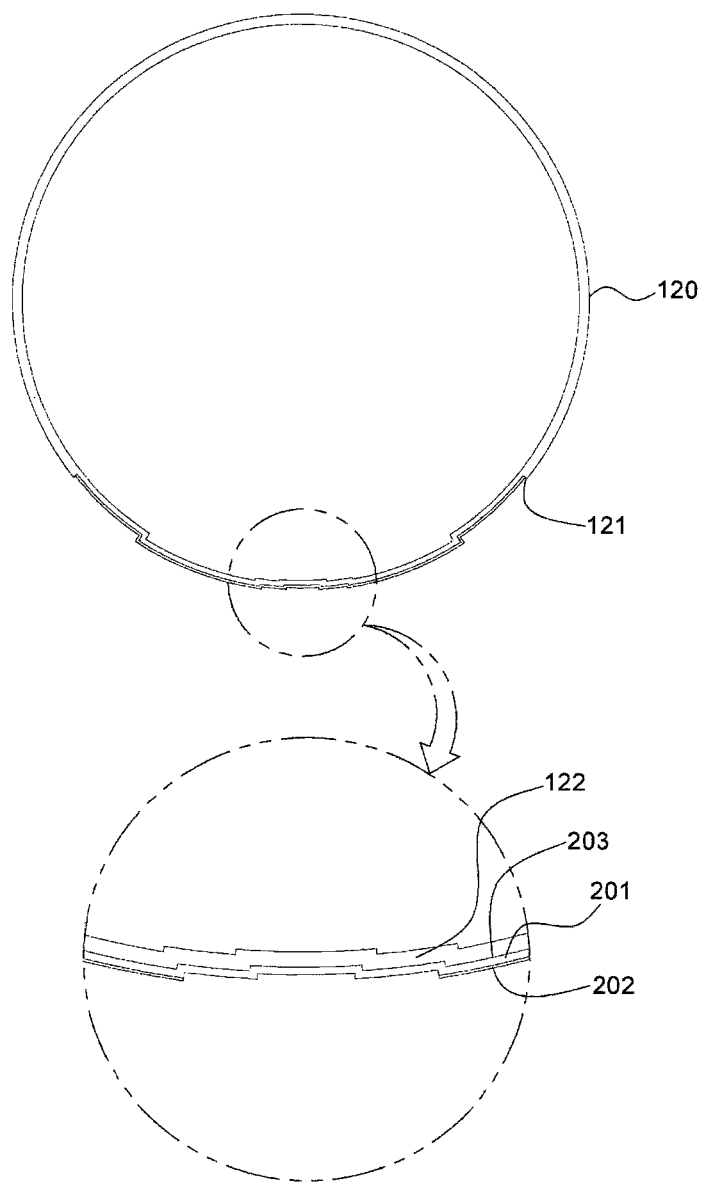
FIG. 4 is a planar cross-sectional view of the pressure container of FIG. 1.

As shown in FIG. 4, the 3D portion 122 formed on the pressure container 100 may protrude outward compared with other portions so as to stand out compared with other portions.

Portions of the 3D portion 122 may also protrude by various degrees and may be implemented with a character, a number, a picture, a shape, a pattern, a design, or the like so as to attract interest or attention of people who see the 3D portion 122.

The label 200 may be attached onto the 3D portion 122 and the printing layer 202 may be positioned on a surface of the label 200 to match the surface of the label 200 and may protrude by the 3D portion 122, thereby advantageously and further attracting consumers' attention through color, reflectivity, and hologram as well as a shape.

Here, a boundary surface of the printing layer 202 may correspond to a boundary surface of the 3D portion 122.

Although described below, the 3D portion 122 is formed on the pressure container 100 because a 3D groove 322 (refer to FIG. 9A~9D) that accurately matches the 3D portion 122 is formed in a mold used in a blowing operation and, thus, the printing layer 202 of the label 200 needs to accurately hide the 3D groove 322.

In this state, when a pre-form 700 (refer to FIG. 9A~9D) is expanded, a portion of the pre-form 700, which is expanded toward the 3D groove 322, may form the 3D portion 122 and may simultaneously and three-dimensionally form the label 200 while pressing the label 200 toward an internal surface of the 3D groove 322.

Figure 5:
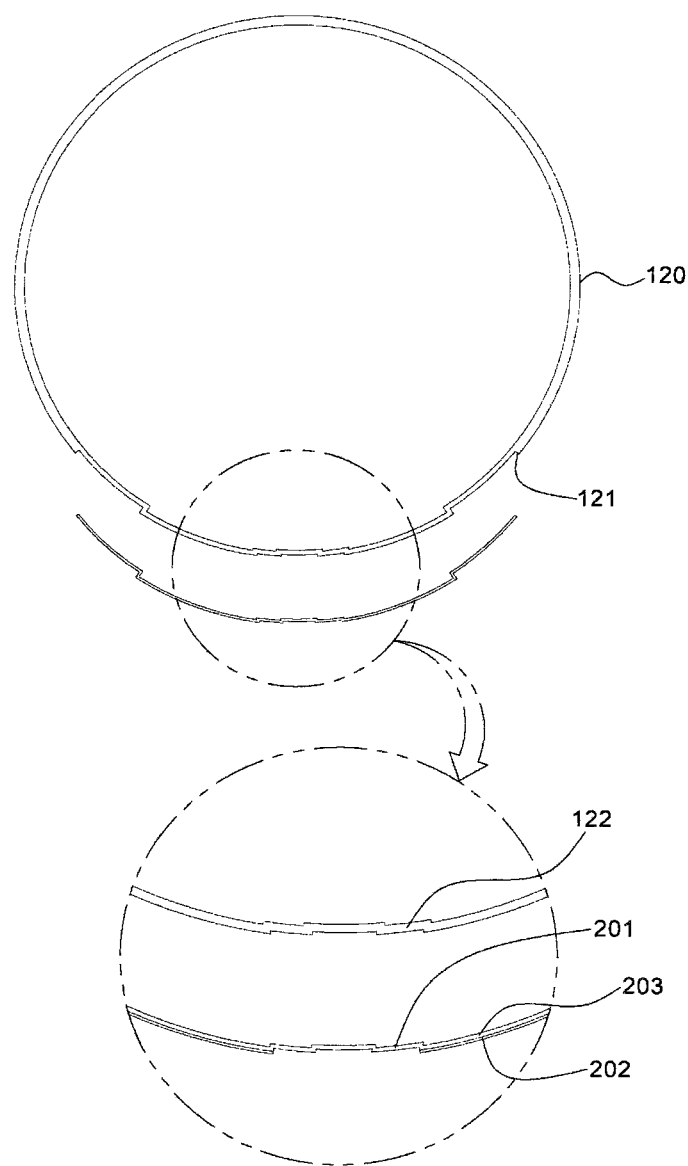
FIG. 5 is a planar cross-sectional view illustrating a state in which a pressure container and a label are separated.

FIG. 5 illustrates a state in which the pressure container 100 and the label 200 are separated.

When the label 200 is detached from the pressure container 100 after the label 200 is deformed while being attached to the pressure container 100, a portion of the label 200, corresponding to the printing layer 202, may be three-dimensionally deformed to match a shape of the 3D portion 122 of the pressure container 100 due to thermal and physical deformation.

However, as described above, the label 200 may be originally formed as a planar 2D structure, the printing layer 202 formed like a planar shape may be formed on an external surface of the description portion 201, and the adhesive layer 203 may be formed on an internal surface of the description portion 201.

Figure 6:
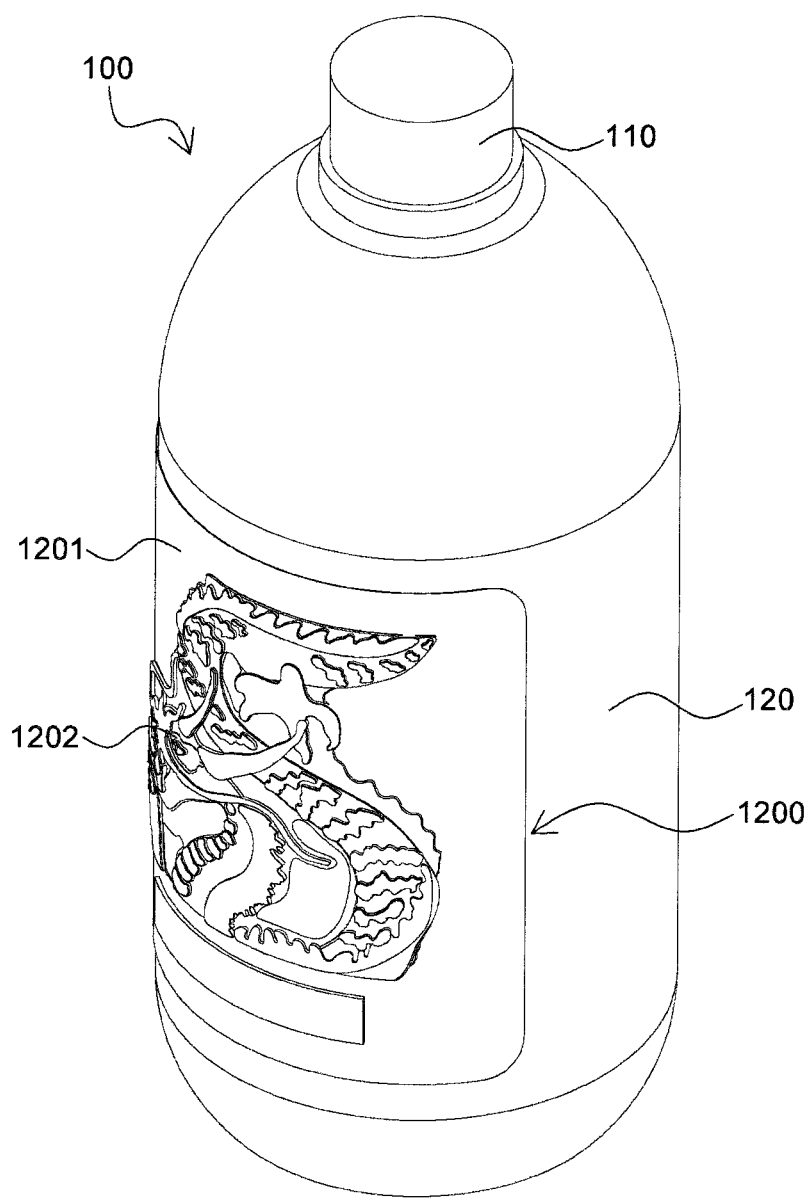
FIG. 6 is a perspective view of a pressure container including an in-mold label with a 3D picture formed therein.
Figure 7:
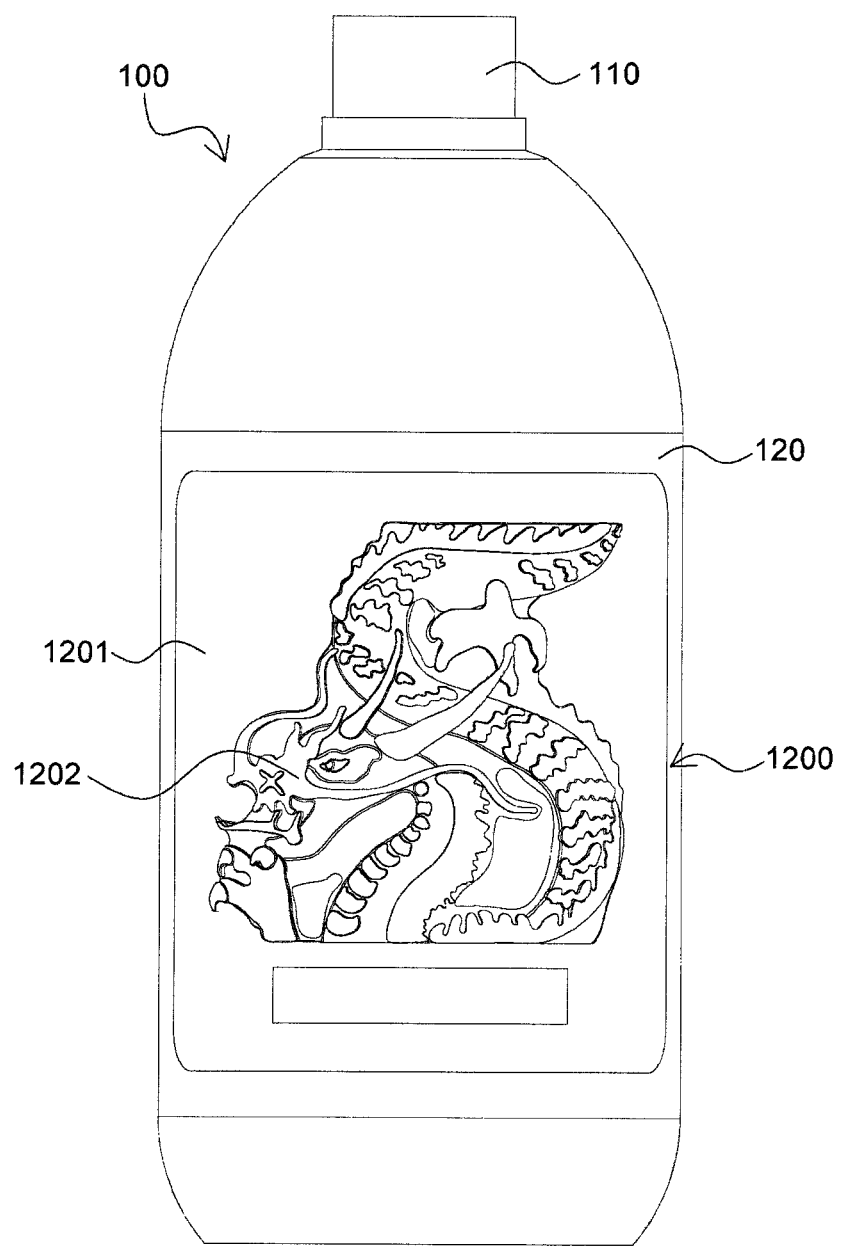
FIG. 7 is a front view of the pressure container of FIG. 6.
Figure 8:
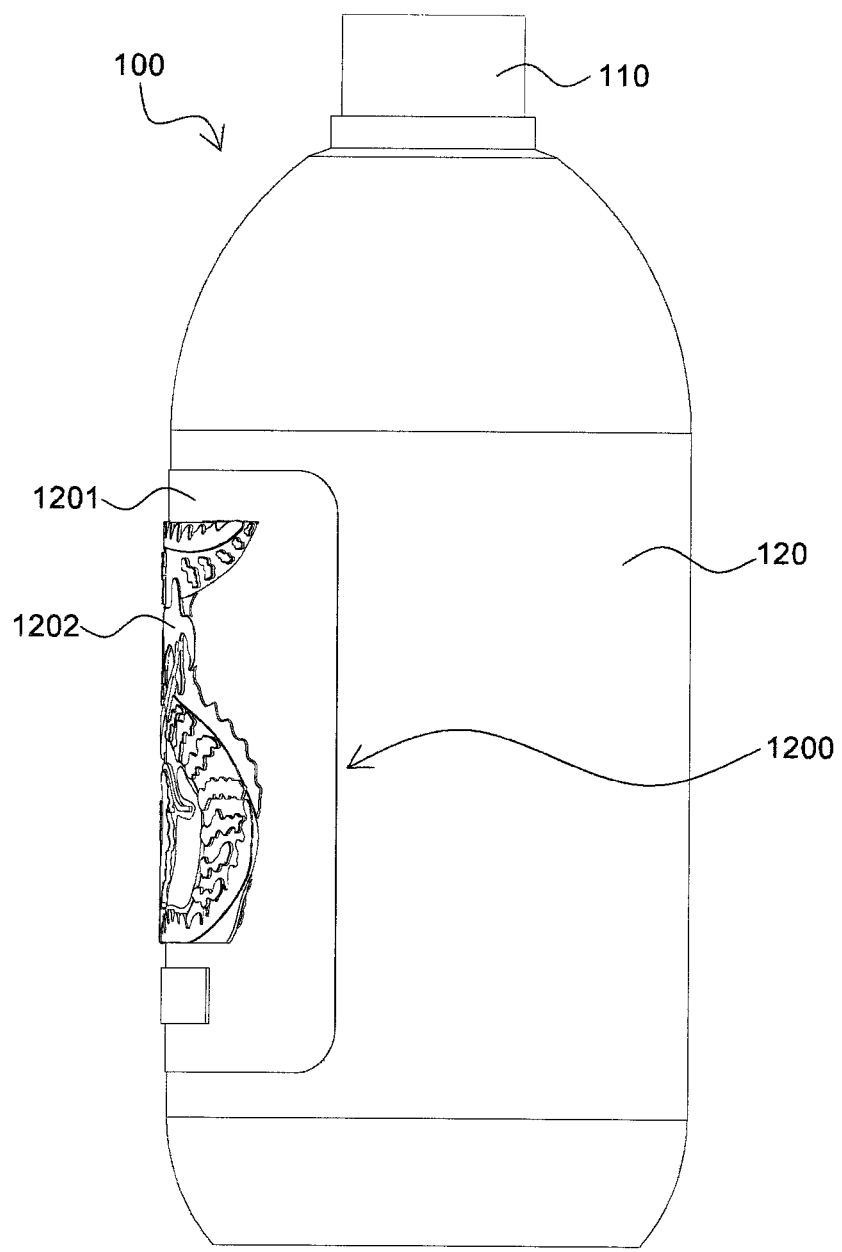
FIG. 8 is a side view of the pressure container of FIG. 6.

FIGS. 6 to 8 are diagrams illustrating the case in which a picture (e.g., dragon) is three-dimensionally formed on the pressure container 100.

FIGS. 1 to 5 illustrate the case in which a character is capable of being three-dimensionally formed and FIGS. 6 to 8 illustrate the case in which a complex type picture or pattern other than a character is capable of being formed.

Here, a label is originally and two-dimensionally formed like a planar dragon.

However, after a 3D groove shaped like a dragon is formed on an internal surface of a mold cavity to be used in a blowing operation and a dragon picture is attached on the 3D groove to accurately match the 3D groove, when a pre-form is expanded by injecting air, a 3D portion shaped like a 3D groove may be formed on a surface of a container by expanding a surface of a pre-form to move toward the 3D groove shaped like a dragon.

Accordingly, the printing layer 202 with a dragon picture may accurately achieve a stereoscopic effect and may be three-dimensionally changed.

Figure 9B:
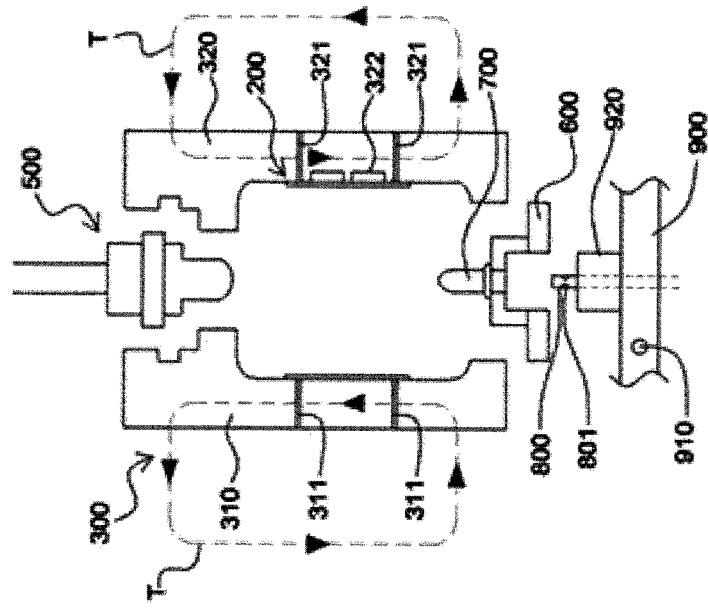
Figure 9A:
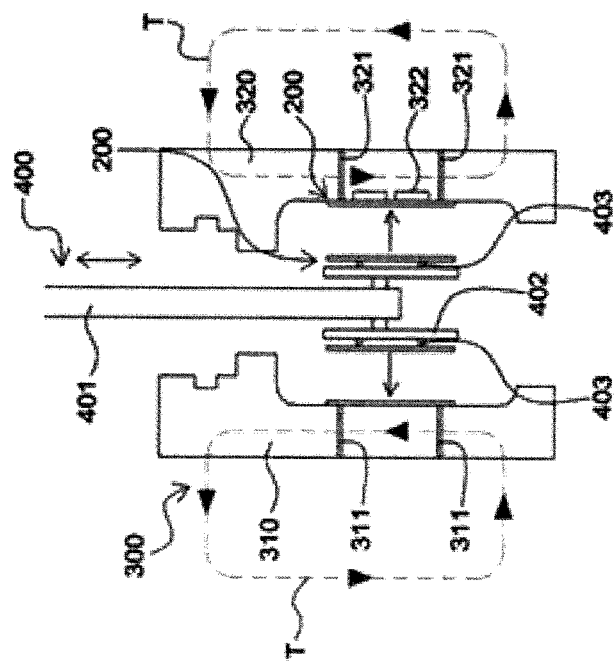

FIGS. 9A to 9D are diagrams illustrating a procedure of manufacturing a pressure container including an in-mold label according to the present invention. As shown in FIG. 9A, molds 310 and 320 for manufacturing a shape of the pressure container 100 may be spaced apart from each other.

The molds 310 and 320 need to be heated through hot water or a heater and dotted line arrows T that circulate indicate a heating state in FIGS. 9A~9D and 10A~10D.

Although described in detail below, the molds 310 and 320 need to be heated in order to easily attach a label to a container and to strongly and stably the attachment state.

The 3D groove 322 for forming the 3D portion 122 (refer to FIG. 2) may be formed on an internal surface of a cavity of the mold 320 that is one of the molds 310 and 320.

When the label 200 is attached to the container, adsorption channels 311 and 321 for vacuum adsorption of the label 200 may be formed in the molds 310 and 320.

While the molds 310 and 320 are separated, a vertical arm 401 of a label feeding apparatus 400 positioned above the molds 310 and 320 may be lowered so as to move the label 200 into the molds 310 and 320.

A pipe 403 that extends and retracts in a horizontal direction (or which moves in a telescopic multi step manner) may be provided in the vertical arm 401 of the label feeding apparatus 400.

The pipe 403 may also have vacuum adsorptive power and, thus, the label 200 is attached to the pipe 403.

In this state, when the pipe 403 is moved to an internal surface of a mold, the label 200 attached to the pipe 403 may be attached to the internal surface of the mold.

When the label 200 is attached to internal surfaces of the molds 310 and 320 by vacuum adsorptive pressure, vacuum pressure of the internal surface of the pipe 403 may be released.

In this state, when the pipe 403 is restored, the label 200 may be maintained in a state in which the label 200 is attached to the internal surface of the cavity.

In this case, a boundary surface of the 3D groove 322 and a boundary surface of the printing layer 202 (refer to FIG. 2) of the label 200 may match each other.

The label 200 is formed as a planar 2D structure and, thus, the label 200 may cover the 3D groove 322 rather than being inserted toward the internal surface of the 3D groove 322.

In this state, a rib plate 600 on which the pre-form 700 is inversely positioned may be moved between the molds 310 and 320 that are separated.

Here, the pre-form 700 may be formed of PE, PET, or the like but may be a PET pre-form.

A bottom forming portion 500 for forming a bottom surface of the pressure container 100 afterward may be positioned above the molds 310 and 320.

Figure 9D:
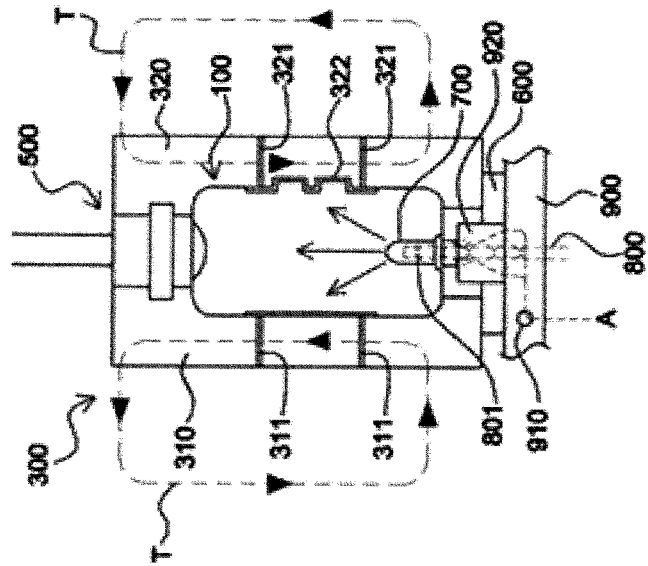
Figure 9C:
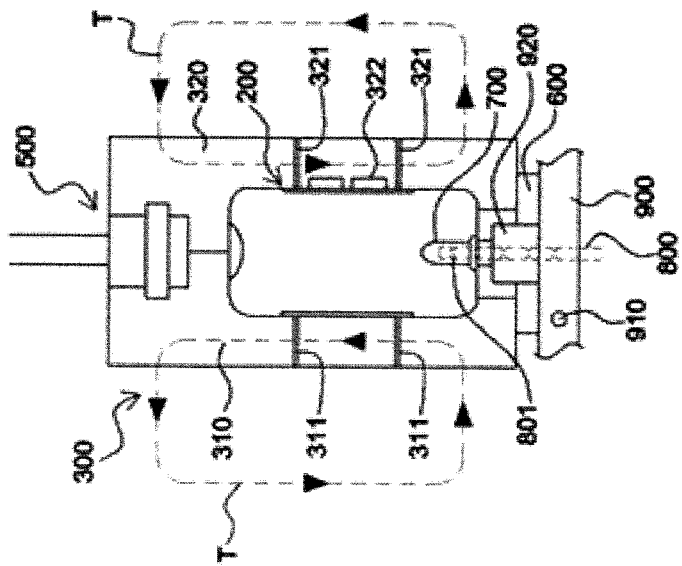

As shown in FIG. 9C, the molds 310 and 320 may be closed and the bottom forming portion 500 may also close upper portions of the molds 310 and 320.

In this state, lower portions of the molds 310 and 320 may be closed by the rib plate 600.

In this state, for a blowing operation for expanding the pre-form 700, an air supplying port 920 of an air injection apparatus may be inserted into a lower portion of the rib plate 600 and positioned at an inlet of the pre-form 700 and a pipe 800 of the air injection apparatus for supplying air for cooling a container after the container is completely expanded may be inserted into the lower portion of the rib plate 600 and moved into the pre-form 700.

The air supplying port 920 of the air injection apparatus may be disposed above a body portion 900, a channel for moving air may be provided in the body portion 900 and connected to the air supplying port 920, and a connection hole 910 may be formed in an external side of the body portion 900 and connected to the channel.

Accordingly, when a hose (not shown) connected to an apparatus for supplying compressed air, such as a compressor (not shown) installed outside the molds, is connected to the connection hole 910 to supply air, the air may be moved through a channel provided in the body portion 900 and discharged in a direction toward the air supplying port 920.

The pipe 800 of the air injection apparatus may be disposed through the air supplying port 920 in an up and down direction. The pipe 800 of the air injection apparatus may be provided to be moved in an up or down direction by a separate actuator (not shown) and speed of the up or down movement may also be adjusted.

A plurality of ejection holes 801 for ejecting air may be formed in an outer circumference surface of the pipe 800 of the air injection apparatus.

In this state, when air is injected into the air supplying port 920 of the air injection apparatus, the pre-form 700 may be expanded and deformed to correspond to a shape of the internal surface of the sealed cavity of the molds 310 and 320, as shown in FIG. 9D.

Hereinafter, a procedure of extending the pre-form 700 to be formed as a container and a labeling procedure during the container forming procedure will be described in detail.

As shown in FIG. 9C, the air supplying port 920 may be moved upward and positioned at the inlet of the pre-form 700. The pipe 800 of the air injection apparatus may also be moved upward and inserted into the inlet of the pre-form 700.

In this state, air may be injected as indicated by "A" while the pipe 800 is moved upward, injected into the connection hole 910, moved along with an internal portion of the body portion 900, discharged from the air supplying port 920 and, then, introduced into the pre-form 700 so as to expand the pre-form 700.

Air discharged from the air supplying port 920 may be moved into a space between the inlet of the pre-form 700 and the pipe 800.

As such, a route (the connection hole 910->the internal portion of the body portion 900->the air supplying port 920->the space between the inlet of the pre-form 700 and the pipe 800->the internal portion of the pre-form 700) along which air for expanding the pre-form is moved is defined as a first route.

Injected air may be supplied at room temperature or to be heated.

Pressure of air injected during a container expansion procedure may be within a first pressure range (e.g., 1.5 to 2.0 MPa). The first pressure range may be a pressure range in which a surface of the pre-form 700 is prevented from being torn or damaged while the pre-form 700 is expanded at appropriate speed.

However, the pressure range may be changed without being limited to the example.

Figure 10A:
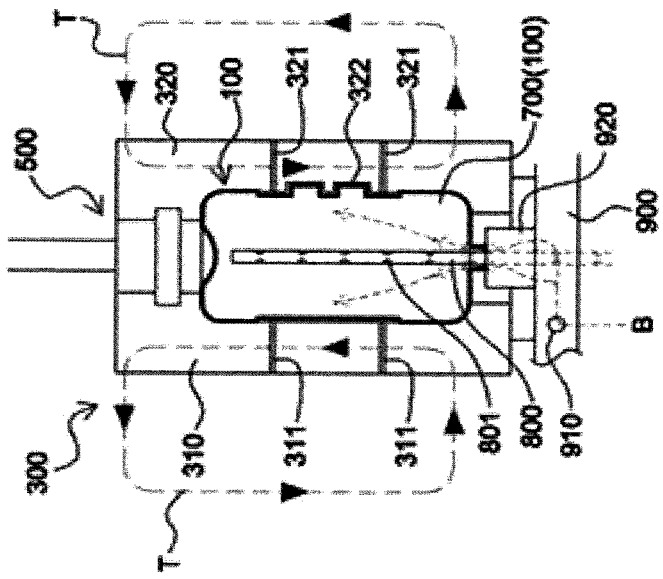

As shown in FIG. 10A, air may be injected through the air supplying port 920 and the pre-form 700 may be expanded to extend via blowing and, accordingly, the air may be moved above the pipe 800 of the air supplying apparatus. In this case, an upper end portion of the pipe 800 of the air injection apparatus may move the internal portion of the pre-form 700 upward to facilitate expansion and extension of the pre-form 700.

Figure 10B:
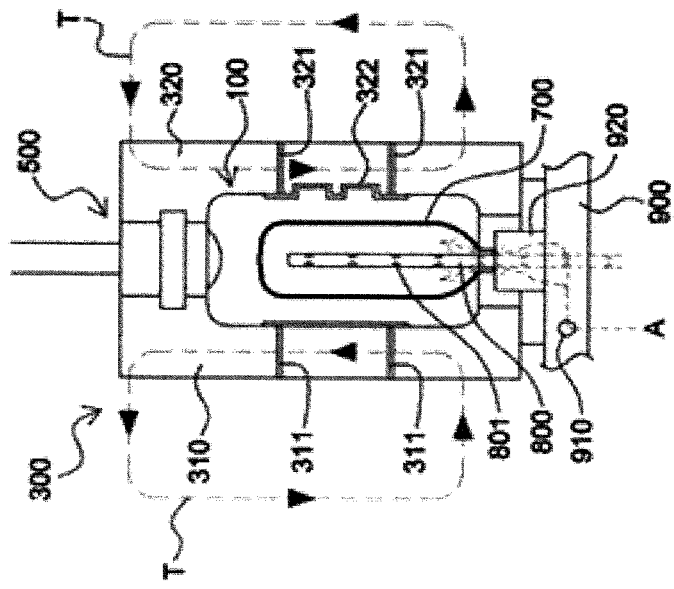

Accordingly, as shown in FIG. 10B, the pre-form 700 may be formed like a shape of the container 100 to correspond to a shape of the internal surface of the mold.

As described above, the 3D groove 322 may be formed in the mold 320 and the 3D portion 122 (refer to FIG. 2) may be formed in the container to correspond to a shape of the 3D groove 322.

When a portion of a surface of the pre-form 700 is moved toward the 3D groove 322, the surface portion may pressurize the label 200 that covers the 3D groove 322 to deform the label 200 to correspond to a shape of the 3D groove 322.

As such, during the procedure of forming a container, the label 200 attached to the internal surfaces of the molds 310 and 320 may be attached to the surface of the container.

As described above with reference to FIGS. 4 and 5, the adhesive layer 203 may be formed on an internal surface of the label 200 and melted at an atmosphere of a specific temperature (e.g., 50° C.) or more to be closely adhered to the internal surface and, accordingly, when the adhesive layer 203 is adhered to the surface of the pre-form 700 due to surface temperature of the hot pre-form 700 and temperature of the molds 310 and 320, the adhesive layer 203 may be melted to tightly fix the label 200 to a surface of the pressure container 100.

In addition, the 3D portion 122 (refer to FIG. 2) may be formed on a surface of the pressure container by the 3D groove 322 and, in this case, the 3D portion 122 may be covered by the label 200 to provide figural and visible 3D features to the pressure container along with the label 200.

The pre-form may be closely adhered to the molds 310 and 320 to be deformed and formed like a container and air (which is indicated by "B") at a pressure in a second pressure range higher than the first pressure range may be injected into the container in a state in which a label is attached to the container. Only the pressure range is raised and a route along which air moves is the same as the first route.

Temperature of injected air may be maintained in a room-temperature state or a heated state (e.g., 40 to 90° C.).

This may be performed in order to more accurately form a detailed shape of a container, a 3D portion, or an end portion of the 3D portion after the pre-form 700 is expanded to a certain degree and to easily attach a label to a container surface, in particular, a surface with the 3D portion formed thereon.

Here, the second pressure range may be a pressure range (e.g., 2.5 to 4.0 MPa (25 to 40 bar)) higher than the first pressure range (e.g., 1.5 to 2.0 MPa (15 to 20 bar)). However, the pressure range may be changed without being limited to the example.

Figure 10C:
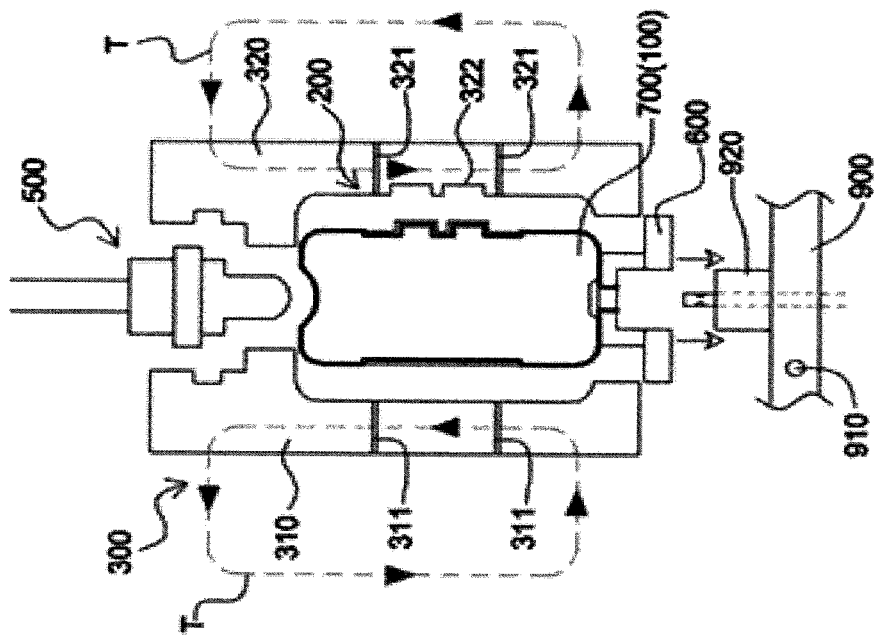

Then, as shown in FIG. 10C, a procedure of injecting cooled air through the pipe 800 of the air injection apparatus to cool the container may be required.

Here, air may be introduced into the container 100 through the pipe 800 of the air injection apparatus to cool the container 100 and may be re-discharged from a space between an inlet of the container and the pipe 800 of the air injection apparatus. This route is defined as a second route and is indicated by "C".

When the molds are separated immediately after the container is formed, the container may contract due to a temperature difference between air temperature and the container and, thus, errors such as deformation and deviation of the container may occur and, further, a label may be detached from the container.

However, when the container is on standby to cool the molds in order to compensate for this, productivity may be lowered and, when the molds are cooled, a label may not be appropriately attached to the container.

In order to overcome this disadvantage, cooling air may be supplied into the formed container and discharged to maximize the productivity of the container.

Here, a pressure at which cooling air is injected may be 1.5 to 4.0 Mpa (15 to 40 bar) but may be changed without being limited thereto. In addition, air temperature may be room temperature or lower temperature.

During the container forming procedure shown in FIGS. 9A~9D and 10A~10D, the adhesive layer 203 may be easily melted and adhered to the molds 310 and 320 so as to easily tightly fix the label 200 to the surface of the pressure container 100 and surface temperature of the molds 310 and 320 may be maintained at a temperature of 40 to 80° C.

To this end, heating may be continuously performed as indicated by "T" in the molds 310 and 320 shown in FIGS. 9A~9D and 10A~10D.

However, the temperature may be departed from the temperature range and may be adjustable depending on the cases.

The pressure container according to the present invention may be formed of plastic resin and, in particular, may be formed of a PET material that is appropriate for a pressure container.

However, in the case of a pre-form formed of PET, surface temperature of the pre-form may be about 90 to 100° C. and latent heat of the surface may not be high. In particular, compared with a pre-form formed of PE, the pre-form formed of PET is much different from the pre-form formed of PE in that the pre-form formed of PET has low latent heat of the surface in that the pre-form formed of PE has surface temperature of 180 to 200° C.

Accordingly, when a container is formed using a PET pre-form, the pre-form formed of PET has low latent heat and, thus, the latent heat of the PET pre-form may be insufficient to completely and tightly perform labeling.

Accordingly, as described above, the molds 310 and 320 need to be separately heated to easily perform labeling.

To this end, the present invention may propose a process of hating the molds 310 and 320 instead of cooling the molds 310 and 320 so as to compensate for low latent heat of the PET pre-form such that a label is more easily attached to a container surface and a 3D structure formed on the container surface and the attachment state may be further fixed.

However, as such, when the molds are heated, this may adversely affect cooling of a container and, thus, a process (which is indicated by "C" in FIG. 10C) of injecting cooling air through the pipe 800 of the air injection apparatus is introduced.

The cooling air may be injected into the container, the container may be cooled and, then, the air may be discharged between the container inlet and the pipe 800.

As such, the molds 310 and 320 are heated to tightly attach a label to a container and cooling air is injected into the container so as to increase cooling speed of the container and to increase production speed of the labeled container.

Figure 10D:
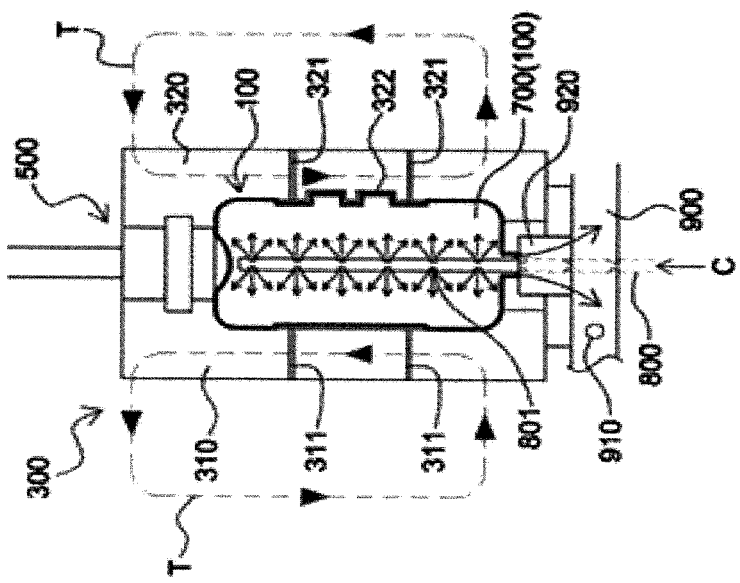

After the cooling process is completely performed on the container, the pipe 800 of the air injection apparatus may be moved in a down direction, as shown in FIG. 10D, the molds 310 and 320 may be separated and, then, the container 100 on which labeling and cooling are completely performed may be externally extracted.

FIG. 11 is a flowchart obtained by summarizing a process of manufacturing a container that has a 3D structure and is labeled according to the present invention.

First, as shown in FIG. 9A, the molds 310 and 320 (refer to FIGS. 9A~9D and 10A~10D) with the 3D groove 322 (refer to FIGS. 9A~9D and 10A~10D) formed therein may be separated (S1101) and the molds 310 and 320 may be heated (S1102).

As shown in FIG. 9A, while the molds are separated, a label may be attached to an internal surface of the molds by using a label feeding apparatus (S1103). In this case, the adsorption channels 311 and 321 (refer to FIGS. 9A~9D and 10A~10D) may be provided in the molds so as to attach the label to the internal surface of the molds by vacuum adsorptive pressure.

As shown in FIG. 9B, the pre-form 700 (in detail, the PET pre-form 700) may be disposed in a space between the separated molds (S1104).

The pre-form 700 may be supported by the rib plate 600 and positioned in a lower region of the space between the molds 310 and 320.

In this state, as shown in FIG. 9C, the molds 310 and 320 may be closed (S1105) and, as shown in FIG. 9D, the air supplying port 920 may be raised and inserted into the pre-form 700 so as to inject heated air at a pressure in a first pressure range (S1106).

In this case, as shown in FIG. 10A, the pre-form 700 may be expanded and the pipe 800 of the air injection apparatus may also be raised together.

Accordingly, the pre-form may be completely expanded to be changed to a container shape, a 3D structure may be formed in the container to correspond to a shape of the 3D groove 322 provided in the mold 320, and the label 200 may be attached to a surface of the container via in-mold labeling.

In this case, in order to completely form a 3D structure on the container and to more tightly performing labeling, air heated at a pressure in a second pressure range higher than the first pressure range may be injected into the container (S1107).

The molds are maintained to be continuously heated and, thus, cooling air may be injected into the container through the pipe 800 of the air injection apparatus in order to cool the labeled container (S1108).

When cooling is completed, the pipe 800 and the air supplying port 920 of the air injection apparatus may be re-lowered and, then, the molds 310 and 320 may be separated (S1109), and the container that has a 3D structure and is labeled may be externally extracted (S1110).

According to the present invention, 3D shape, color, and texture may be provided to a pressure container, thereby achieving advertisement effect of products by using this pressure container.

Various types of patterns, characters, designs, numbers, and pictures may be formed in a cavity of a mold to form various types of 3D structures.

A conventional 3D structure inevitably uses thermal contraction or direct attachment and, in this regard, a boundary of a 3D portion of a container and a boundary of a printing surface (characters, pictures, patterns, texture, design, number, etc.) of a label portion that needs to cover the 3D portion may not match each other.

However, according to the present invention, a 3D structure may be formed by high force via in-mold labeling and blowing methods and, simultaneously, a portion corresponding to the label may be accurately adhered to the 3D structure so as to advantageously provide a pressure container that realizes aesthetics and arrangement accuracy.

According to the present invention, molds may be heated rather than being cooled during a blowing process for molding the container.

Thereby, low latent heat of a PET pre-form may be compensated for so as to easily attach a label to a 3D structure and to tightly attach the label.

According to the present invention, air may be injected while the pipe is inserted into the pre-form so as to uniformly distribute pressure of blowing in an expanding pre-form.

Cooling air as well as blowing air may be injected to the pipe and, thus, the container may be internally cooled rather than being externally cooled.

Accordingly, even if the molds are heated, a cooling process may be performed on the container.

Accordingly, low latent heat may be compensated for by heating the molds so as to tightly fix a label to a 3D structure and to introduce a separate cooling process of the container, thereby preventing the productivity of the container from being degraded.

While the present invention has been particularly shown and described with reference to exemplary embodiments thereof, it will be understood by those of ordinary skill in the art that various changes in form and details may be made therein without departing from the spirit and scope of the present invention as defined by the following claims.

Accordingly, the true scope of the present invention may be determined by technological idea of the claims.

What is claimed is:

1. A method of manufacturing a pressure container comprising an in-mold label and a three-dimensional (3D) portion, the method comprising:
    heating molds formed with a 3D groove, the 3D groove having a first shape corresponding to the 3D portion to be formed on a surface of the pressure container;
    separating the molds;
    attaching a label including a printing layer to internal surfaces of the molds to allow at least a portion of the label to cover the 3D groove, the printing layer having a second shape corresponding to the 3D portion, wherein the attaching the label includes aligning the printing layer with the 3D groove to match the first and second shapes;
    positioning a pre-form of the pressure container in a cavity of the molds;
    closing the molds and expanding the pre-form to be attached to the label by injecting air into the pre-form at a pressure in a specific range through a first route;
    three-dimensionally deforming the printing layer of the label and a portion of the expanded pre-form attached to the printing layer to correspond to the 3D groove of the molds using the pressure of the injected air;
    injecting cooling air into the pre-form through a second route in the pre-form that is expanded and deformed to be the pressure container, while the molds are being heated; and
    separating the molds and detaching the pressure container with the 3D portion and the printing layer of the label deformed to correspond to the 3D portion from the molds,
    wherein the expanding the pre-form including:
        injecting air at a first pressure into the pre-form to initially expand the pre-form; and
        injecting air at a second pressure greater than the first pressure into the pre-form to further expand the pre-form after the label is attached to the expanded pre-form, and
    wherein the pre-form includes an inlet through which external air is injected therein, the inlet facing bottoms of the molds.

2. The method of claim 1, wherein the label further includes:
    a description portion; and
    an adhesive layer provided on an internal surface of the description portion and melt-adhered to the internal surface at a specific temperature or more, and
    the printing layer of the label is formed on an outer surface of the description layer and includes a texture, a pattern, a picture, or a character printed thereon.

3. The method of claim 1, wherein the first route is provided to be moved in up and down directions and implemented with an air supplying port to be disposed at the inlet of the pre-form; and
    the second route is provided to be moved in up and down directions and implemented with a pipe of an air injection apparatus, to be inserted into the pre-form through the inlet of the pre-form.

4. The method of claim 1, wherein the heating of the molds includes heating the molds to maintain a temperature of the molds in a range of 40 to 80° C.

5. A method of manufacturing a pressure container comprising an in-mold label and a three-dimensional (3D) portion, the method comprising:
    heating molds formed with a 3D groove, the 3D groove having a first shape corresponding to the 3D portion to be formed on a surface of the pressure container;
    separating the molds;
    attaching a label including a printing layer to internal surfaces of the molds to allow at least a portion of the label to cover the 3D groove, the printing layer having a second shape corresponding to the 3D portion, wherein the attaching the label includes aligning the printing layer with the 3D groove to match the first and second shapes;
    positioning a pre-form of the pressure container in a cavity of the molds;
    closing the molds and expanding the pre-form to be attached to the label by injecting air into the pre-form at a pressure in a specific range by using an air injection apparatus installed outside the molds;
    three-dimensionally deforming the printing layer of the label and a portion of the expanded pre-form attached to the printing layer to correspond to the 3D groove of the molds using the pressure of the infected air;
    injecting cooling air into the pressure container formed by the expanded pre-form, while the molds are being heated; and separating the molds and detaching the pressure container with the 3D portion and the printing layer of the label deformed to correspond to the 3D portion from the molds, wherein the expanding the ore-form including:
injecting air at a first pressure into the pre-form to initially expand the pre-form; and
injecting air at a second pressure greater than the first pressure into the pre-from to further expand the pre-form after the label is attached to the expanded ore-form, and wherein the pre-form includes an inlet through which external air is injected therein, the inlet facing bottoms of the molds.

6. The method of claim 5, wherein the expanding of the pre-form is performed by injecting air through an air supplying port of the air injection apparatus disposed at the inlet of the pre-form and configured to supply air into the pre-form; and wherein the pre-form is cooled by injecting cooling air into the pre-form through a pipe of the injection apparatus provided to be inserted into the inlet of the pre-form.

7. A method of manufacturing a PET container comprising an in-mold label and a three-dimensional (3D) portion, the method comprising:

heating molds formed with a 3D groove, the 3D groove having a first shape corresponding to the 3D portion to be formed on a surface of the PET container;

separating the molds;

attaching a label including a printing layer to internal surfaces of the molds to allow at least a portion of the label to cover the 3D groove, the printing layer having a second shape corresponding to the 3D portion, wherein the attaching the label includes aligning the printing layer with the 3D groove to match the first and second shapes;

positioning a PET pre-form of the PET container in a cavity of the molds;

closing the molds and expanding the PET pre-form to be attached to the label by injecting air into the PET pre-form at a pressure in a specific range while inserting a pipe of an air supplying apparatus positioned outside the molds into the PET pre-form;

three-dimensionally deforming the printing layer of the label and a portion of the expanded PET pre-form attached to the printing layer to correspond to the 3D groove of the molds using the pressure of the injected air;

injecting cooling air into the PET pre-form that is expanded and deformed to be the PET container, while the molds are being heated; and separating the molds and detaching the PET container with the 3D portion and the printing layer of the label deformed to correspond to the 3D portion from the molds, wherein the expanding the PET pre-form including:
injecting air at a first pressure into the PET pre-form to initially expand the PET pre-form; and
injecting air at a second pressure greater than the first pressure into the PET pre-form to further expand the PET pre-form after the label is attached to the expanded PET pre-form, and wherein the PET pre-form includes an inlet through which external air is injected therein, the inlet facing bottoms of the molds.

8. The method of claim 7, wherein the label further includes:
a description portion; and
an adhesive layer provided on an internal surface of the description portion and melt-adhered to the internal surface at a specific temperature or more, and
the printing layer of the label is formed on an outer surface of the description layer and includes a texture, a pattern, a picture, or a character printed thereon.

* * * * *

UNITED STATES PATENT AND TRADEMARK OFFICE
CERTIFICATE OF CORRECTION

PATENT NO. : 10,688,708 B2
APPLICATION NO. : 15/640607
DATED : June 23, 2020
INVENTOR(S) : Woo Hong Byun It is certified that error appears in the above-identified patent and that said Letters Patent is hereby corrected as shown below:

In the Claims

Column 12, Line 64; In Claim 5, "infected" should be changed to --injected--.

Column 13, Line 5; In Claim 5, "ore-form" should be changed to --pre-form--.

Column 13, Line 6; In Claim 5, "infecting" should be changed to --injecting--.

Column 13, Line 11; In Claim 5, "ore-form" should be changed to --pre-form--.

Column 13, Line 21-22; In Claim 6, "the injection apparatus" should be changed to --the air injection apparatus--.

Signed and Sealed this
Tenth Day of November, 2020

Andrei Iancu
*Director of the United States Patent and Trademark Office*